US009615062B2

(12) United States Patent
Sablak et al.

(10) Patent No.: US 9,615,062 B2
(45) Date of Patent: Apr. 4, 2017

(54) MULTI-RESOLUTION IMAGE DISPLAY

(75) Inventors: Sezai Sablak, Clovis, CA (US); Greg Millar, Coarsegold, CA (US); Farzin Aghdasi, Clovis, CA (US)

(73) Assignee: PELCO, INC., Clovis, CA (US)

( * ) Notice: Subject to any disclaimer, the term of this patent is extended or adjusted under 35 U.S.C. 154(b) by 518 days.

(21) Appl. No.: 12/982,676

(22) Filed: Dec. 30, 2010

(65) Prior Publication Data

US 2012/0169871 A1 Jul. 5, 2012

(51) Int. Cl.
| H04N 7/18 | (2006.01) |
| H04N 21/4728 | (2011.01) |
| H04N 21/2187 | (2011.01) |
| H04N 21/6587 | (2011.01) |
| H04N 21/472 | (2011.01) |
| G08B 13/196 | (2006.01) |

(52) U.S. Cl.
CPC ........... *H04N 7/18* (2013.01); *H04N 21/2187* (2013.01); *H04N 21/4728* (2013.01); *H04N 21/47202* (2013.01); *H04N 21/6587* (2013.01); *G08B 13/19691* (2013.01)

(58) Field of Classification Search
None
See application file for complete search history.

(56) References Cited

U.S. PATENT DOCUMENTS

| 6,147,709 A | 11/2000 | Martin et al. |
| 6,285,804 B1 | 9/2001 | Crinon et al. |
| 6,493,032 B1 | 12/2002 | Wallerstein et al. |
| 6,665,841 B1 * | 12/2003 | Mahoney et al. ............ 715/204 |
| 6,738,073 B2 * | 5/2004 | Park et al. ..................... 345/629 |
| 2002/0063711 A1 | 5/2002 | Park et al. |
| 2006/0015508 A1 * | 1/2006 | Kondo et al. ................... 707/10 |
| 2006/0142981 A1 | 6/2006 | Greiffenhagen et al. |
| 2006/0175549 A1 * | 8/2006 | Miller et al. .................. 250/334 |
| 2007/0126874 A1 | 6/2007 | Kake |
| 2009/0207310 A1 * | 8/2009 | Arai .............................. 348/581 |
| 2010/0002070 A1 * | 1/2010 | Ahiska ........................... 348/36 |

(Continued)

OTHER PUBLICATIONS

International Search Report and Written Opinion; PCT/US2011/067812; Aug. 9, 2012.

(Continued)

*Primary Examiner* — Joseph Ustaris
*Assistant Examiner* — Edemio Navas, Jr.
(74) *Attorney, Agent, or Firm* — Hunter Clark PLLC (57) ABSTRACT

An image display method includes: receiving, from a single camera, first and second image information for first and second captured images captured from different perspectives, the first image information having a first data density; selecting a portion of the first captured image for display with a higher level of detail than other portions of the first captured image, the selected portion corresponding to a first area of the first captured image; displaying the selected portion in a first displayed image, using a second data density relative to the selected portion of the first captured image; and displaying another portion of the first captured image, in a second displayed image, using a third data density; where the another portion of the first captured image is other than the selected portion of the first captured image; and where the third data density is lower than the second data density.

20 Claims, 7 Drawing Sheets

(56) References Cited

U.S. PATENT DOCUMENTS

2010/0245584 A1* 9/2010 Minasyan et al. ............ 348/159
2011/0302527 A1* 12/2011 Chen et al. .................. 715/800

OTHER PUBLICATIONS

D. Sinno; "Attentive Management of Configurable Sensor Systems"; Ph.D. thesis, Arizona State University; May 2000.
Stephen Gould, Joakim Arfvidsson, Adrian Kaehler, Benjamin Sapp, Marius Meissner, Gary Bradski, Paul Baumstarck, Sukwon Chung, and Andrew Y. Ng; "Pperipheral-Foveal Vision for Real-time Object Recognition and Tracking in Video"; In Proceedings of the Twentieth International Joint Conference on Artificial Intelligence (IJCAI); 2007.
D. Cochran and R. Martin; "Nonlinear Filtering Models of Attentive Vision"; IEEE International Symposium on Circuits and Systems, pp. 26-29; 1996.
L. Li, D. Cochran, and R. Martin; "Target Tracking with an Attentive Foveal Sensor", Conference Record of the Thirty-Fourth Asilomar Conference on Signals, Systems and Computers; pp. 182-185; 2000.
Supplementary European Search Report dated Jun. 4, 2014 for European Application No. EP11853036, 8 pages.
International Preliminary Report on Patentability for International Application No. PCT/US2011/067812, dated Jul. 11, 2013, 6 pgs.
IP Australia 1st Examination Report for Application No. 2011352023, dated Aug. 17, 2015, 3 pgs.
State Intellectual Property Office of the P.R.C. (SIPO) 1st Office Action and Search Report (Official Translation) for Application No. 201180063148.4 dated Sep. 9, 2015, 12 pgs.
IP Australia Notice of Acceptance for Application No. 2011352023, dated Jan. 28, 2016, 2 pgs.

* cited by examiner

MULTI-RESOLUTION IMAGE DISPLAY

BACKGROUND

Increasingly, many aspects of our lives are monitored, recorded, and displayed. For example, video surveillance is prevalent, recording scenes for news, general information, and security purposes. Security cameras record visual information of desired locations such as banks, storefronts, automatic teller machines, businesses, roadways, parks, etc. Further, people voluntarily record themselves and post images on the Internet, or are voluntarily recorded by another person (e.g., a TV personality, a person being interviewed for broadcast news media, etc.) who sends (e.g., broadcasts) the corresponding video.

Video recordings are used for a variety of purposes. Persons whose images are captured can be used to help identify and locate the persons, e.g., if they have committed a crime. Unexpected events can be captured by constantly-monitoring cameras that would otherwise not be captured, and the events viewed, e.g., on television or through the internet. Further, video can be analyzed for particular events or characteristics, such as stopped vehicles, presence of a moving object such as a person, etc.

Video recordings are typically captured at a much higher resolution than can be or is displayed by a viewing device such as a computer monitor or television screen. Consequently, sometimes captured video information corresponding to multiple camera pixels is used to produce a single display pixel, and other times some camera pixels are selected and used for the display and unused camera pixel information is discarded.

SUMMARY

An example computer program product residing on a non-transitory processor-readable medium includes instructions configured to cause a processor to: analyze first and second captured images from a camera, wherein a perspective of the camera is different between the first and second captured images; select a portion of the first captured image for display with a higher level of detail than other portions of the captured image, the selected portion corresponding to a first area of the first captured image, the first captured image having a first data density; produce first image information, representing a first image of the selected portion of the first captured image, using a second data density relative to the selected portion of the first captured image; and produce second image information, representing a second image of a non-selected portion of the first captured image, using a third data density; where the non-selected portion of the first captured image is other than the selected portion of the first captured image; and where the third data density is lower than the second data density.

Implementations of such a computer program product may include one or more of the following, and/or other, features. A ratio of an area of the selected portion to an area of the non-selected portion is different from a ratio of an area of the first image to an area of the second image. The instructions further include instructions configured to cause the processor to determine that a set of pixels in the first captured image represent an object in motion relative to the second captured image, and wherein the instructions configured to cause the processor to select are configured to cause the processor to select the portion of the first captured image such that the selected portion includes the set of pixels.

An example image display method includes: receiving, from a single camera, first image information for a first captured image and second image information for a second captured image, the first and second images captured from different perspectives, the first image information having a first data density; selecting a portion of the first captured image for display with a higher level of detail than other portions of the first captured image, the selected portion corresponding to a first area of the first captured image; displaying the selected portion of the first captured image, in a first displayed image, using a second data density relative to the selected portion of the first captured image; and displaying another portion of the first captured image, in a second displayed image, using a third data density; where the another portion of the first captured image is other than the selected portion of the first captured image; and where the third data density is lower than the second data density.

Implementations of such a method may include one or more of the following, and/or other, features. The method further includes analyzing the first and second image information to determine that the portion of the first captured image contains a moving object. The first displayed image is the second displayed image such that the selected portion and the another portion are displayed on a single display. The selected portion is displayed in the first displayed image disproportionately in size relative to the selected portion in the first captured image. The method further includes determining that a set of pixels in the first captured image represent an object in motion, wherein the selecting comprises selecting the portion of the first captured image such that the selected portion includes the set of pixels. Displaying the selected portion includes displaying the selected portion using a first display and displaying the another portion includes displaying the another portion using a second display separate from the first display. The further includes capturing the first captured image. Displaying the second portion includes displaying the second portion in a location on a display screen independent of a location of the selected portion relative to the first captured image. Displaying the second portion includes displaying the second portion in a location on a display screen dependent on a location of the selected portion relative to the first captured image. Displaying the second portion includes displaying the second portion with an area independent of an area of the selected portion. Displaying the second portion includes displaying the second portion with an area dependent on an area of the selected portion.

An example video surveillance system includes: a memory; an image capture device communicatively coupled to the memory and configured to capture video images from different perspectives with a first resolution and to provide the video images to the memory; selecting means, communicatively coupled to the memory, for selecting a first portion of at least one of the video images captured from different perspectives, the first portion having an area that is a first percentage of an area of the at least one of the video images; and processing means, communicatively coupled to the memory, for processing the video images for display on a display screen by: converting the first portion of at the least one of the images into a first display image having a second area; converting a second portion of the at least one of the stored video images into a second display image having a third area, the second area being a second percentage of a sum of the second area and the third area, the second percentage being higher than the first percentage; and at least one display communicatively coupled to the processing means and configured to display the first display image and the second display image concurrently.

Implementations of such a system may include one or more of the following, and/or other, features. The system further includes motion detection means, communicatively coupled to the memory, for determining that a set of pixels in a first of the video images represent an object in motion, and wherein the selecting means are configured to select the first portion of the at least one of the video images such that the first portion includes the set of pixels. The at least one display is a single display. The at least one display includes first and second displays coupled to the processing means to display the first portion on the first display and to display the second portion on the second display.

Items and/or techniques described herein may provide one or more of the following capabilities, and/or other capabilities not mentioned. Items of greater interest in a captured image, e.g., of a video, of a moving camera can be displayed with higher resolution than items of lesser interest. The items of greater interest and the items of lesser interest can be displayed on different displays, or in a single display. A viewer can see items of interest in a display more clearly than other items. Moving objects can be tracked and displayed with higher resolution than stationary or relatively stationary objects. Objects can be displayed with higher resolution in a portion of a display that facilitates viewing with high-resolution portions of a person's eye. Further, it may be possible for an effect noted above to be achieved by means other than that noted, and a noted item/technique may not necessarily yield the noted effect.

DETAILED DESCRIPTION

Techniques are provided for displaying different portions of an image with different effective resolutions. For example, a video system includes a camera configured to provide a video output of a given resolution. The camera is further configured to detect motion of an object in captured images while the camera is in motion (e.g., panning, tilting, and/or zooming, etc.). The camera monitors the moving object, localizes the motion of the object, selects a corresponding portion of the image, and provides a higher resolution output for the selected portion of the image corresponding to and including the moving object. The selected portion of the image may be displayed along with the remainder of the image on a single display, with the selected portion displacing some of the remainder of the image. The selected portion thus has a higher effective resolution as more information is displayed for the selected portion than for other, non-selected, portions of the image. Alternatively, the selected portion may be displayed on a separate region of the display showing the remainder of the image, or on a display separate from the display showing the remainder of the image. Further or alternatively, the selected portion of the image displayed with a higher resolution may be selected manually by a user.

Figure 1:
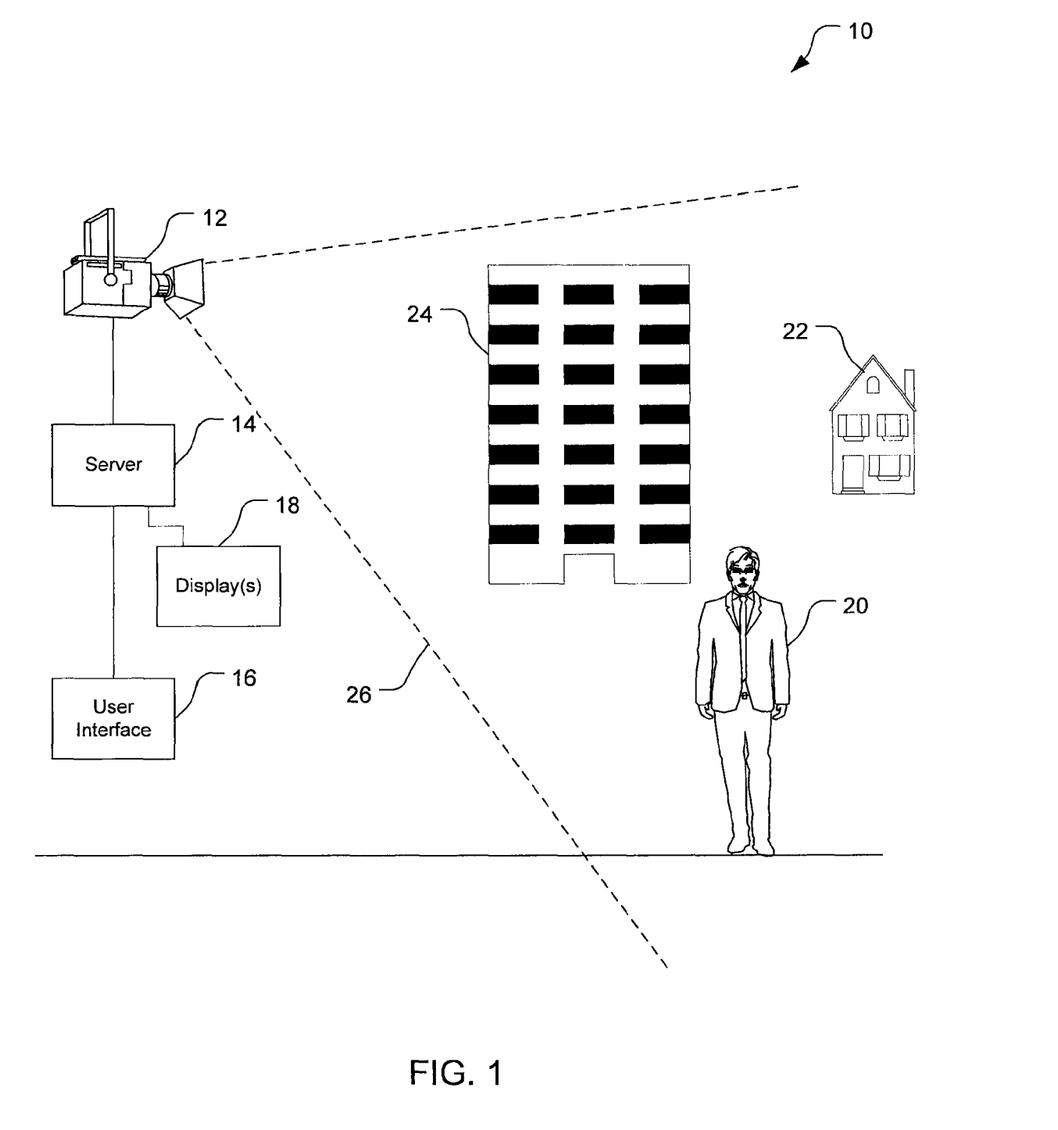
FIG. 1 is a schematic diagram of a video system.

Referring to FIG. 1, a video system 10 includes a camera 12, a server 14, and a user interface 16. The camera 12 is configured to capture images of objects, such as a person 20, disposed within a field of view 26 of the camera 12. The camera 12 is capable of capturing images from different perspectives, e.g., different positions, different directions, different orientations, and/or different magnifications, here being a PTZ (Pan-Tilt-Zoom) camera, although other types of cameras could be used, e.g., a fixed-position camera, a fixed-image (pan, tilt, and zoom) camera, or other type of camera. Further, while only one camera 12 is shown, the system 10 may include more than one camera. The camera is communicatively connected (e.g., with a wired and/or wireless connection) to the server 14 that is communicatively connected to the user interface 16. The interface 16 includes speakers to provide audio information to a user and includes user input devices including a keyboard, a mouse, and a microphone. Other user input devices may be included, such as a touch-sensitive screen, etc.

The camera 12 has an associated point of view and the field of view 26. The point of view is the perspective (including position) from which a physical region is being viewed by the camera 12. The field of view 26 is the physical region captured in frames by the camera 12.

The display 18 has a lower resolution than the camera 12. The display 18 has fewer pixels than the camera 12 and thus the camera 12 captures more information for each image than the display 18 can show for each image. For example, the display 18 may have a screen that is 14 inches on diagonal, with a width of 9.7 inches, and have 640×480 pixels, providing 66 dpi (dots per inch). This, however, is one example and numerous other display screens may be used that have sizes, pixel counts, and dpi values different from one or more of those in this example.

Figure 2:
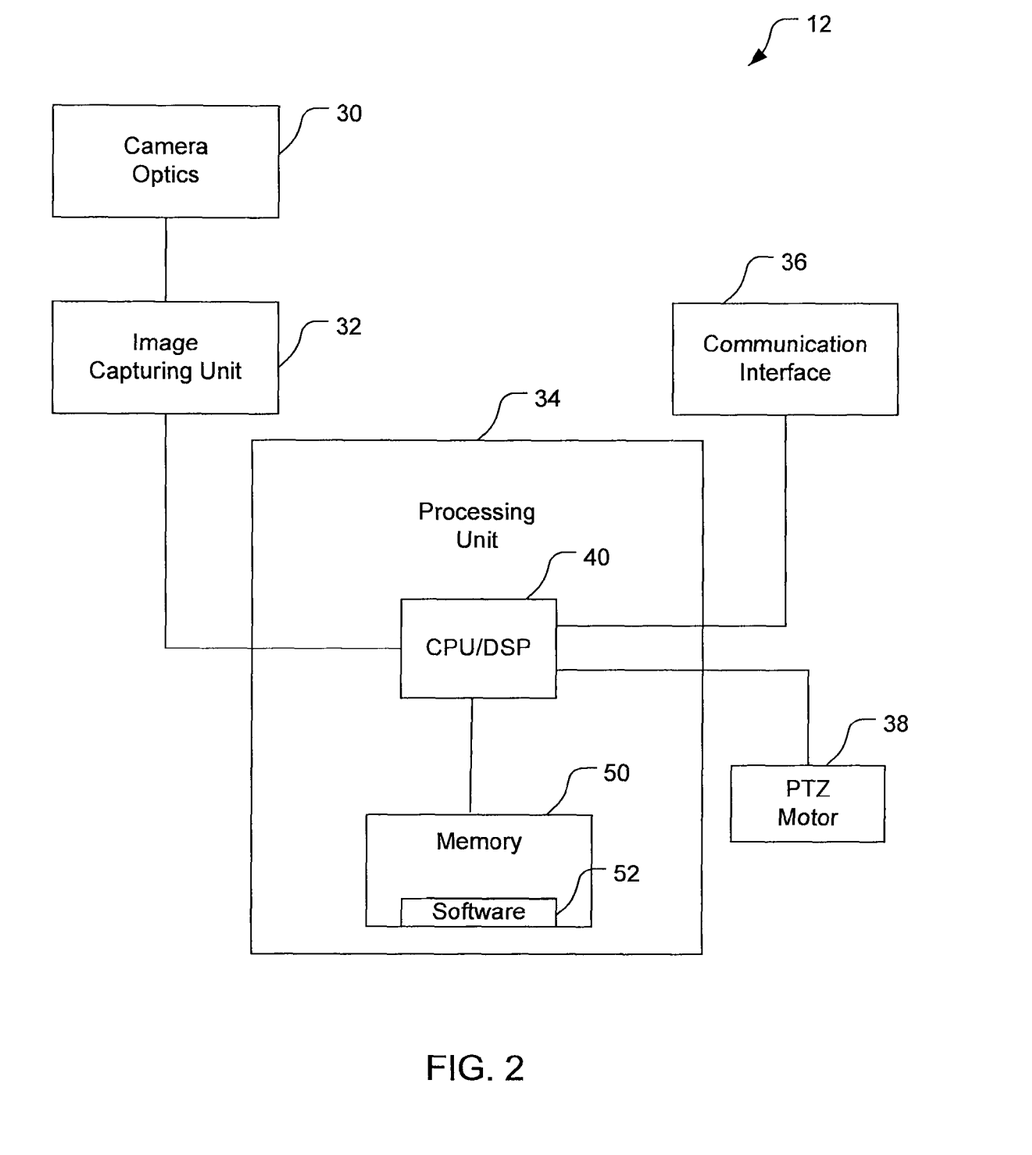
FIG. 2 is a block diagram of components of a camera of the video system shown in FIG. 1.

Referring to FIG. 2, the camera 12 includes camera optics 30, an image capturing unit 32, a processing unit 34, a communication interface 36, and a PTZ motor. The image capturing unit comprises lenses and other optical components, and is communicatively coupled with the image capturing unit 32. The image capturing unit 32 includes a charge-coupled device (CCD) and/or other technology to convert optical images into electrical information that is transferred to the processing unit 34. Also coupled with the processing unit 34 is the communication interface 36 through which information is sent to and received from the server 14, e.g., through a communication network such as a local area network, a wide area network, a wireless network, etc. The PTZ motor 38 is configured to actuate the camera 12 to pan, tilt, and zoom, and may include more than one motor.

The processing unit 34 processes image information and includes a central processing unit (CPU) or digital-signal processor (DSP) 40 and memory 42. The CPU/DSP 40 is preferably an intelligent device, e.g., a personal computer central processing unit (CPU) such as those made by Intel-.RTM. Corporation or AMD.RTM., a microcontroller, an application specific integrated circuit (ASIC), etc. DSPs, such as the DM6446 made by Texas Instruments.RTM., can also be used. The CPU/DSP 40 is coupled to the memory 50 that includes random access memory (RAM) and read-only memory (ROM). The memory 50 is non-transitory and preferably stores machine-readable, machine-executable software code 52 containing instructions that are configured to, when executed, cause the CPU/DSP 40 to perform various functions described herein. Alternatively, the software 52 may not be directly executable by the processor CPU/DSP 40 but is configured to cause the processor CPU/DSP 40, e.g., when compiled and executed, to perform functions described herein. In this example, the display 18 is one video display panel, but more than one video display panel could be used.

Figure 3:
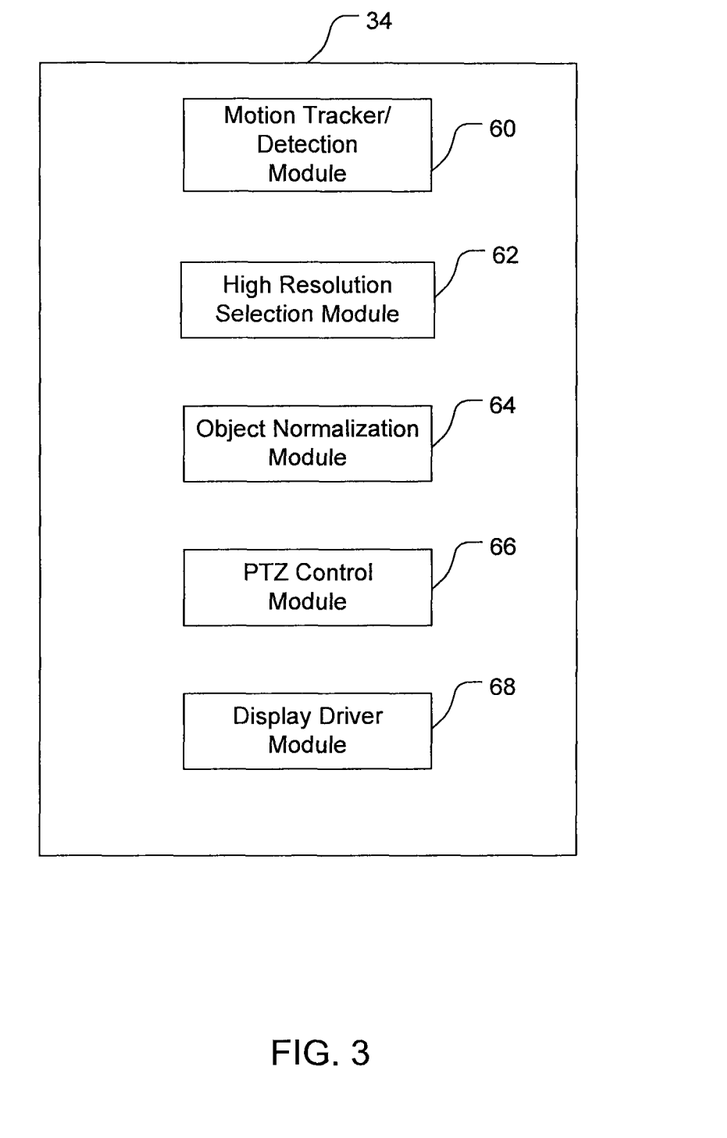
FIG. 3 is a functional block diagram of a processing unit shown in FIG. 2.

Referring also to FIG. 3, the processing unit 34 includes function blocks of a motion tracker/detection module 60, a high resolution selection module 62, an object normalization module 64, a PTZ control module 66, and a display driver module 68. These modules are configured to determine one or more high-resolution portions of an image captured by the camera 12 for which an increased effective resolution is desired, and to drive the display 18 to display the image with two resolutions. The display 18 will display the image with one resolution for a low-resolution portion of the image other than the high-resolution portion, and will display the high-resolution portion with another resolution that is higher resolution than the resolution used for the low-resolution portion. Thus, one resolution is lower relative to the other resolution, and one resolution is higher relative to the other resolution. The different resolutions are not necessarily different data densities (e.g., dots per inch of the display 18), but are different levels of detail and different amounts of data for a given portion of one original image. The appropriate modules could be configured to select multiple regions of a captured image, and to display multiple high-resolution image portions in one window or in multiple windows (where the number of windows may or may not match the number of high-resolution image portions). The description below, however, discusses an example configuration for the selection of one image portion for higher-resolution display, as the principles discussed are applicable to configurations for selection and/or display of multiple high-resolution image portions. The operation of each of the modules 60, 62, 64, 66, 68 is discussed further below.

The motion tracker/detection module 60 is configured to analyze images provided by the image capture unit 32 to determine whether an object within the field of view 26 is moving. The motion detection module 60 can provide indications of what pixels represent one or more objects in motion, thus indicating where in the image there is motion, and the size of each an area in the image that includes an object in motion. Preferably, the module 60 is configured to indicate motion only of an object that is moving greater than a threshold amount, and/or only an object in motion that is not part of a background of the field of view 26.

Figure 4:
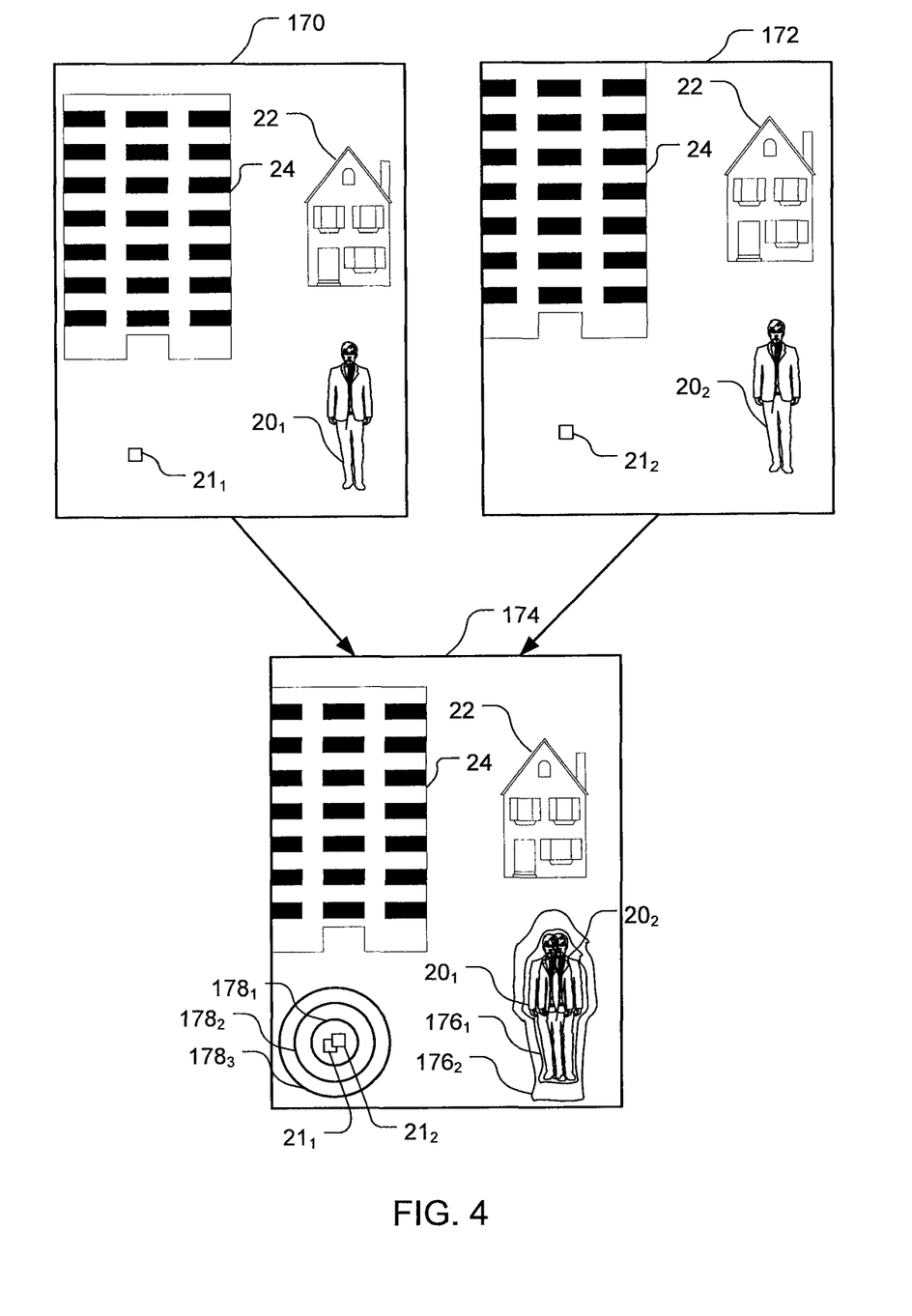
FIG. 4 is a simplified diagram of image registration to localize object movement.

Referring also to FIG. 4, the module 60 is configured to remove global camera movement to localize object movement. The module 60 analyzes multiple images 170, 172 to localize object motion. The image 172 has been captured by the camera 12 having panned to the right, tilted down, and zoomed in relative to the image 170. The module 60 is configured to perform image registration by finding the corners of the images 170, 172, matching features of the images 170, 172 identified by analyzing pixel intensity gradients in the images 170, 172, and aligning stationary objects in the images. The module 60 makes adjustments to the pan, tilt, and zoom between the images 170, 172 as appropriate to remove effects of global movement, i.e., image differences due to different perspectives of the camera due to movement (e.g., translation, pan, tilt, and/or zoom) of the camera between capture of the images 170, 172. The module 60 can make these adjustments based on the images 170, 172 alone, or by also using information about the amounts of pan, tilt, and/or zoom from the PTZ control module 66, or by using the images 170, 172 and the amounts of PTZ. Here, the module 60 registers the images 170, 172 to form a registered image 174. In the registered image 174, the building 24 and the house 22 are aligned, whereas the object 20 does not completely align due to movement of the object 20 from the position $20_1$ to the position $20_2$. The module 60 localizes the motion to regions 176. The motion could be localized to a single region 176, but here is localized to two regions $176_1$, $176_2$. Further, here the module 60 localizes the motion of an object 21 to three regions 178. The region $178_1$ is a circle, and the regions $178_2$, $178_3$ are concentric rings. As shown, the localized regions 176 are irregularly shaped (here, following the perimeter of the object 20) and the regions 178 are regularly shaped, with the regions 178 being in the form of a bulls-eye or target encompassing the object 21.

Figure 5:
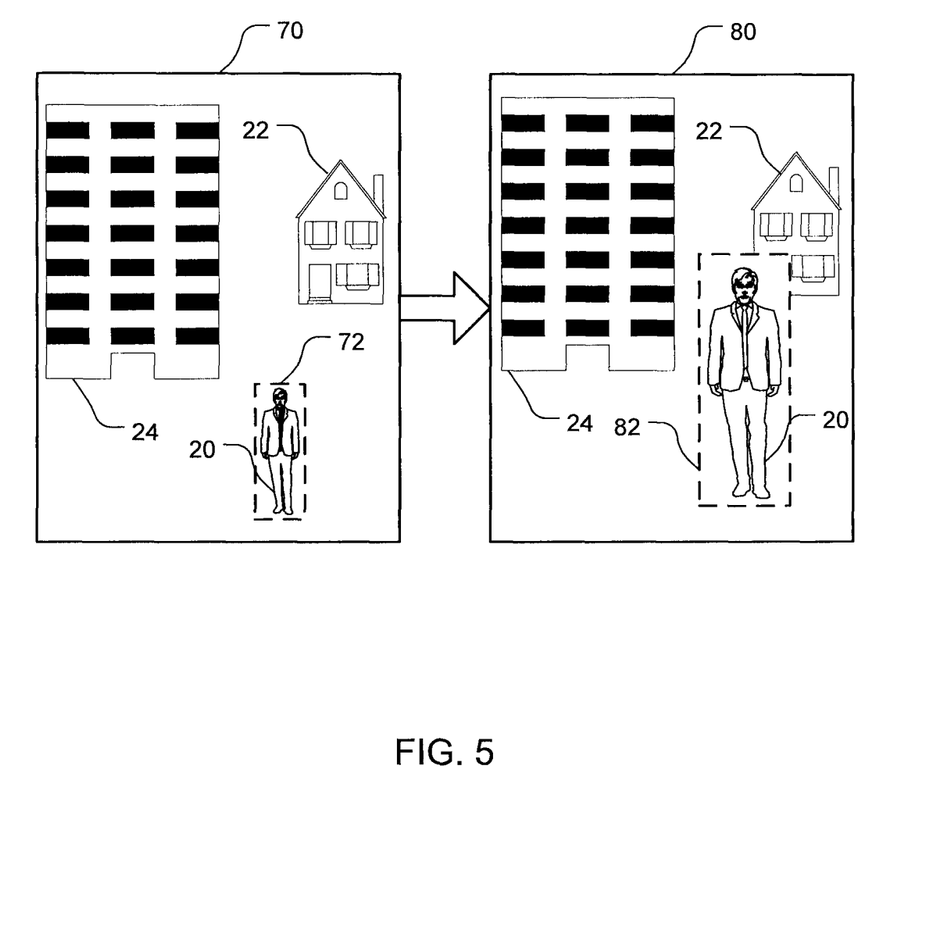
FIG. 5 is a simplified diagram of a mapping of a high-resolution portion of an image captured by the camera shown in FIG. 1 to a high-resolution window of a display shown in FIG. 1.

The high resolution selection module 62 is configured to select one or more regions of interest of a captured image to display with the relatively higher resolution. Referring also to FIG. 5, the module 62 can communicate with the motion tracker/detection module 60 and select a region of interest 72 of an image 70 displayed by the display 18 for high-resolution display, or select the regions 176, 178 identified by the module 60. The regions 72, 176, 178 include all of the displayed pixels indicating the localized objects 20, 21 in motion. Further, or alternatively, the selection module 62 can select one or more of the regions 72, 176, 178 according to input received from the user interface 16, e.g., from keyboard entry or mouse activations by a user, or based on criteria other than user input or motion, and updated by the tracking module 60. The selected portion 72 has a regular, here rectangular, shape that includes the pixels of the object 20 in motion. This can help facilitate processing of the high-resolution portion, including mapping the selected portion 72 to a high-resolution window 82 of an image 80 on the display 18.

The object normalization module 64 communicates with the high resolution selection module 62 to map/re-display the high-resolution portion 72 selected by the module 62 to the high-resolution window 82 of the display 18. A size of the window 82 can be determined/selected in a variety of ways. For example, the size of the window 82 can be fixed size, can be a fixed ratio relative to the size of the region 72, etc. Further, the location of the window 82 can be determined in a variety of ways. For example, the location of the window 82 can be fixed, can be centered in the display image 80, can be dependent upon the location of the region 72 (e.g., the region 72 and the window 82 can be co-centered, have a common lower-edge location relative to the images 70, 72, etc.). The normalization module 64 is configured to normalize or map the region 72 to the window 82 by providing more information regarding pixels data captured by the camera 12 to the display driver module 68. The module 64 determines the information to provide by obtaining pixel information from the image capturing unit 32 corresponding to the region 72 and converting that to pixel information for the window 82 with the corresponding pixel resolution, evenly distributed over the bounds provided by the region 72. Thus, for example, with a 640×480 and 66 dpi display 18, if the region 72 is 2 inches high by 1 inch wide, and the window 82 is four inches high by 2 inches wide, then the normalization module 64 will obtain high-resolution raw pixel information from the image capturing unit 32 corresponding to the region 72 and provide information for 264×132 pixels for the window 82, as opposed to the 132×66 pixels in the region 72. Preferably, where there are multiple regions for a single object, e.g., the regions 176, 178, the re-displayed/mapped resolutions for the regions about one object will be different, e.g., decreasing in resolution as proximity to the object decreases. For example, inner regions will be re-displayed with higher resolution than outer regions, e.g., with the region $178_1$ being re-displayed with a higher resolution than the re-display of the region $178_2$, which will be re-displayed with a higher resolution than the re-display of the region $178_3$.

The display module driver 68 is configured to process the pixels provided by the normalization module 64 and to provide pixel information to the display 18. The driver module 68 provides the pixel information for the image 80, including pixel information for the window 82 and remaining pixel information for remaining portions of the image 70, i.e., the portions of the image 70 that remain, are also in, the image 80 (that is, not displaced by the window 82).

The PTZ control module 66 communicates with the motion tracker/detection module 60 to determine and supply commands to the PTZ motor 38. The control module 66 uses information as to motion in the images captured by the camera 12 to determine where to point the camera optics 30. The control module 66 produces commands to affect the PTZ motor 38 to direct and/or focus the camera optics 30 as appropriate, and provides the commands to the PTZ motor 38 to move the aim of, and/or focus, the optics 30 accordingly.

Figure 6:
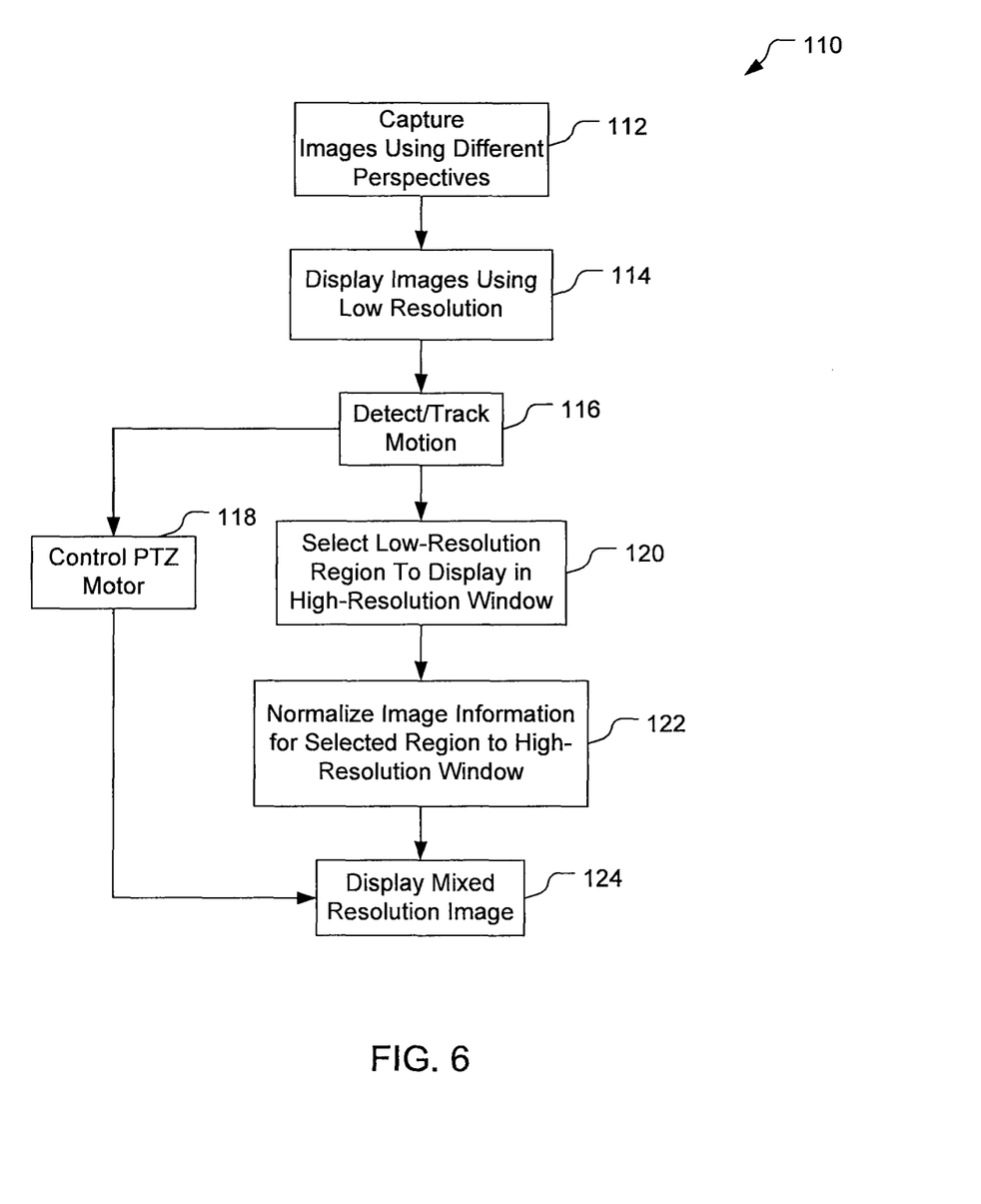
FIG. 6 is a block flow diagram of a process of displaying multiple portions of a single captured image with different resolutions.

Referring to FIG. 6, with further reference to FIGS. 1-5, a process 110 of selectively displaying a captured image portion, with higher resolution than other portions of the captured image, includes the stages shown. The process 110 is, however, an example only and not limiting. The process 110 can be altered, e.g., by having stages added, removed, rearranged, combined, and/or performed concurrently. For example, stage 118 discussed below could be omitted.

At stage 112, the camera 12 captures video images using different perspectives. The camera 12 captures images a very high resolution compared to the display 18, e.g., 8 megapixels and, e.g., 300 dpi. The camera 12 stores the images in the memory 50.

At stage 114, the images captured by the camera 12 are processed and displayed on the display 18. The high-resolution images from the camera 12 are converted to the much lower resolution of the display 18, e.g., 640×480 pixels.

At stage 116, motion of the object 20 is detected and the object 20 is tracked. The motion tracker/detection module 60 determines that the object 20 is in motion over multiple images using image registration. The tracker/detection module 60 also determines the location and direction of movement of the object 20 relative to the image frames and provides this information to the PTZ control module 66.

At stage 118, the PTZ control module 66 uses the information from the motion tracker/detection module 60 to control the PTZ motor 38. The control module 66 controls the motor 38 to direct the camera 12 toward the object 20, e.g., to help center the object 20 in the image and to focus the camera optics 30 on the object 20.

At stage 120, the low-resolution region 72 encompassing the object 20 is selected. The high resolution selection module 62 determines the location and dimensions for the region 72. For example, with the image 70 having x-y horizontal and vertical coordinates, the selection module 62 determines a range of x coordinates and a range of y coordinates for the region 72 that preferably includes the entire object 20. The selection module 62 selects the region 72 based on the information from the motion tracker/detection module 60 as to the location and size of the object 20. Alternatively, or additionally, the module 60 can select the location and/or size using input from the user through the user interface 16. The selection of the region 72 using the image 70 consequently selects the corresponding region in the higher-resolution captured image captured by the camera 12.

At stage 122, the selected low-resolution region 72 is mapped to the high-resolution window 82. The object normalization module 64 uses information about the selected region 72 to obtain the raw pixel information captured by the camera 12 from the memory 50 that corresponds to the region 72. The module 68 processes the raw pixels of the camera resolution, to provide information for the pixels of the window 82 at the display resolution. The window 82 provides higher resolution than the region 72 in that the same set of information is provided, but with more pixels even though the dpi of the region 72 and the window 82 are the same. The contents of the window 82 thus have a third effective resolution, with the image being captured with a first resolution and the display 18 providing a second resolution. The third resolution is greater than the second resolution and lower than the first resolution. The window is displayed with the dpi of the display 18, but there are more pixels being used for the contents of the region 72. That is, there is more information provided by the display 18 for the window 82, and thus more information regarding the content of the region 72 than is provided in the image 70. The data density of the window 82 is the same as for other portions of the image 80 outside the window 82, but the data amount used for the window 82 is higher than the data amount used for the region 72. Thus, the data density (of the image from the camera 12) used to display the region 72 is less than the data density used to display the window 82, and both of these data densities are lower than the data density available from the camera 12. Consequently, the effective resolution of and the level of detail for the contents of the region 72 are increased because the amount of information being displayed for the content corresponding to the region 72 has increased. If multiple regions of interest are provided about a single object, e.g., the regions 176, 178 shown in FIG. 4, then multiple, different resolutions may be provided for the multiple regions.

At stage 124, the mixed-resolution image 80 is displayed. The display driver module 68 provides information to the display 18 to produce the multiple-resolution image 80. The contents of the selected region 72 are displayed in the window 82 concurrently with the non-selected portions of the image 70, except that portion now occupied by the window 82. The display driver module discards or overwrites the information from the image 70 that is now occupied by the window 82 that was not occupied by the region 72. The window 82 occupies a disproportionate amount of the image 80 compared to the image 70, that is, a ratio of the area of the window 82 to the area of the image 80 is larger than a ratio of the area of the region 72 to the area of the image 70. The contents of the window 82 as displayed are thus disproportionate to the contents of the window 82 as captured by the camera 12.

Alternative Configurations

Other examples of configuration (including implementations) are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Also, stage 114 may be omitted from the process 110 shown in FIG. 6. A portion of a captured image can be selected without having been displayed.

Figure 7:
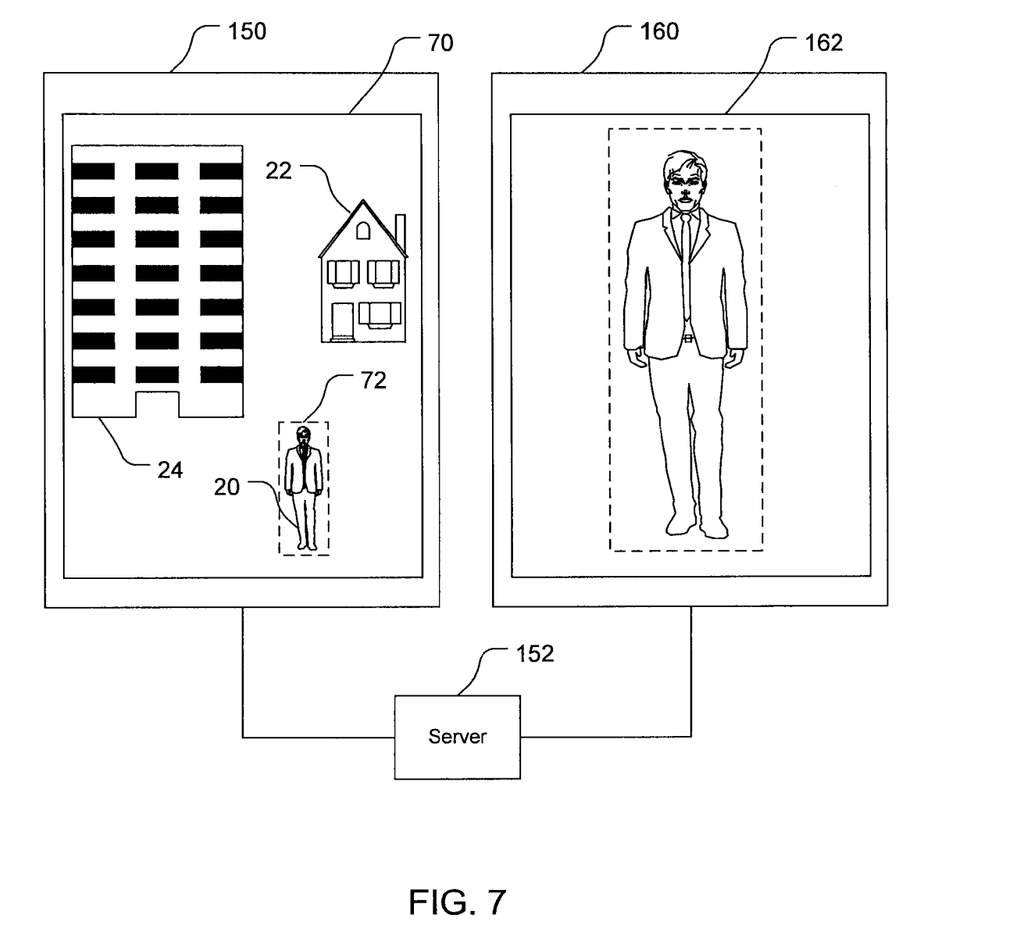
FIG. 7 is a simplified diagram of a dual-display multi-resolution display system.

Further, while the discussion above described display of a multiple-resolution image on a single display, multiple displays could be used. As shown in FIG. 7, a display 150 connected to a server 152 shows the image 70 with the selected region 72 while a display 160 connected to the server 152 shows an image 162 that is the contents of the region 72 with higher resolution than in the image 70.

Further still, the object normalization module 64 can disregard the selection of the region 72 if display in the window 82 would result in lower resolution of the contents in the region 72. For example, if the window 82 is of a fixed size, and the selected region 72 is larger than the fixed size of the window 82, then the module 64 will ignore can be selected in ways other than those described. For example, if the window 82 is smaller, or would otherwise have fewer pixels, than the region 72, then the module 64 can disregard the selection of the window 72. In this case, an indication of why the selection is being ignored can be provided, e.g., via the user interface 16.

As another example, the motion tracker/detection module 60 could build a background that is a composite of images for persistent objects in the field of view 26 of a fixed-position camera 12 that are not candidates for increased-resolution display. For example, the persistent stationary objects 22, 24 shown in FIG. 5 would form part of the background as would other persistent objects such as roads, bushes, trees, streams, lakes, flagpoles and flags, road signs, bridges, etc. For example, the module 60 could build the background image of persistent and/or recurring pixel intensities using Gaussian distributions for persistent and recurring pixel intensities to build a Gaussian mixture model. The persistent/recurring pixel intensities can be combined and stored as the composite background image. The motion tracker/detection module 60 would filter out pixels with background intensities for motion analysis and provide the indications of motion for non-background objects, ignoring background motion. Alternatively, the high resolution selection module 62 could build and store the background image and use the background as a filter, thus further processing only non-background motion.

Also, while a camera may select a region of images and provide higher-resolution information for that region, the camera may provide the same level of resolution information for all images. An external processor could selectively process the information based on movement of objects in the images to provide higher resolution display for the portions of the images corresponding to moving objects.

Further still, more than one invention may be disclosed.

What is claimed is:

1. A computer program product residing on a non-transitory processor-readable medium and comprising instructions configured to cause a processor to:

analyze first and second captured images from a position-tilt-zoom (PTZ) camera, wherein a perspective of the (PTZ) camera is different between the first and second captured images;

make a determination from the first captured image and the second captured image, that a set of pixels in the first captured image contains an object in motion;

select a first portion, that includes the set of pixels, of the first captured image in response to the determination that the set of pixels includes the object in motion;

select the first portion of the first captured image for display with a higher level of detail than other portions of the first captured image, the first captured image having a first resolution;

produce first image information, representing a first image of the first portion of the first captured image, using a second resolution that has a higher effective resolution than the first resolution; and display the first image with the second resolution in a location on a display screen dependent on a location of the first portion relative to the first captured image;

wherein the first portion defines a first area and the first image defines a second area that is larger than the first area and that is at least partially outside of, and immediately adjacent to, the first area.

2. The computer program of claim 1 wherein the instructions are configured to cause a processor to display the first portion concurrently with at least one other portion of the first captured image.

3. The computer program product of claim 1 wherein the instructions configured to cause the processor to display the first portion comprise instructions configured to cause the processor to display the first image such that the second area overlaps at least some of the first area.

4. The computer program product of claim 3 wherein the instructions configured to cause the processor to display the first portion comprise instructions configured to cause the processor to display the first image such that the second area at least one of (1) is co-centered with the first area or (2) shares an edge with the first area.

5. An image display method comprising:

receiving, from a single position-tilt-zoom (PTZ) camera, first image information for a first captured image and second image information for a second captured image, the first and second captured images captured from different perspectives, the first image information having a first resolution;

analyzing the first and second image information from the first and second captured images;

making a determination, from the first captured image and the second captured image, that a set of pixels in the first captured image contains an object in motion;

selecting a first portion, that includes the set of pixels, of the first captured image for display with a higher level of detail than other portions of the first captured image, the first captured image having a first resolution, the selecting being in response to the determination that the set of pixels includes the object in motion;

displaying the first portion of the first captured image, in a first image, using a second resolution that has higher effective resolution than the first resolution, the first portion defining a first area and the first image defining a second area that is larger than the first area and that is at least partially outside of, and immediately adjacent to, the first area;

wherein displaying the first portion comprises displaying the first portion in a location on a display screen dependent on a location of the first portion relative to the first captured image.

6. The method of claim 5 wherein the first captured image comprises the first portion of the first captured image and a second portion of the first captured image, the method further comprising displaying, on a single display, a second image concurrently with the first image, the second image comprising the second portion of the first captured image minus a portion occupied by the first image.

7. The method of claim 5 wherein displaying the first portion comprises displaying the first portion using a first display, the method further comprising displaying a portion of the first captured image, other than the first portion, using a second display separate from the first display.

8. The method of claim 5 further comprising capturing the first captured image.

9. The method of claim 5 wherein displaying the first portion comprises displaying the first image such that the second area overlaps at least some of the first area.

10. The method of claim 9 wherein displaying the first portion comprises displaying the first image such that the second area is co-centered with the first area.

11. The method of claim 9 wherein displaying the first portion comprises displaying the first image such that the second area shares an edge with the first area.

12. The method of claim 5 further comprising displaying a second portion of the first captured image, other than the first portion, with an area independent of an area of the first portion.

13. The method of claim 5 further comprising displaying a second portion of the first captured image, other than the first portion, with an area dependent on an area of the first portion.

14. The image display method of claim 5, wherein analyzing the first and second image information comprises building a background image, and wherein making the determination that the set of pixels in the first captured image contains the object in motion does not include pixels associated with the background image.

15. A video surveillance system comprising:
a memory;
a position-tilt-zoom (PTZ) camera communicatively coupled to the memory and configured to capture video images with a first resolution and to provide the video images to the memory;
motion detection means, communicatively coupled to the memory, for making a determination that a set of pixels in the video images represents an object in motion,
selecting means, communicatively coupled to the memory, for selecting a first portion of a respective video image of the video images in response to the determination that the set of pixels includes an object in motion, such that the first portion includes the set of pixels, the first portion defining a first area that is a first percentage of an area of the at least one of the video images; and
processing means, communicatively coupled to the memory, for processing the video images for display on a display screen by:
converting the first portion of at the least one of the images into a first display image defining a second area and a second resolution higher than the first resolution; and
converting a second portion of the at least one of the stored video images into a second display image defining a third area, the second area being a second percentage of a sum of the second area and the third area, the second percentage being higher than the first percentage; and
at least one display communicatively coupled to the processing means and configured to display the first display image and the second display image concurrently;
wherein the processing means are for causing the display to display the first display image in a location on the display screen dependent on a location of the first portion relative to the respective video image such that at least some of the second area is outside of, and immediately adjacent to, the first area.

16. The system of claim 15 wherein the at least one display is a single display.

17. The system of claim 15 wherein the at least one display comprises first and second displays coupled to the processing means to display the first portion on the first display and to display the second portion on the second display.

18. The system of claim 15 wherein the processing means are for causing the display to display the first display image such that the second area overlaps at least some of the first area.

19. The system of claim 18 wherein the processing means are for causing the display to display the first display image such that the second area at least one of (1) is co-centered with the first area or (2) shares an edge with the first area.

20. The video surveillance system of claim 15, wherein the motion detecting means is further for building a background image and not including pixels associated with the background image in making the determination that the set of pixels in the video images represents the object in motion.

* * * * *

UNITED STATES PATENT AND TRADEMARK OFFICE
CERTIFICATE OF CORRECTION

PATENT NO. : 9,615,062 B2  Page 1 of 1
APPLICATION NO. : 12/982676
DATED : April 4, 2017
INVENTOR(S) : Sablak et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 559 days.

Signed and Sealed this
Twenty-fifth Day of September, 2018

Andrei Iancu
*Director of the United States Patent and Trademark Office*